Aug. 5, 1958
E. J. CRONIN
2,846,563
ULTRASONIC WELDER
Filed Oct. 7, 1955
2 Sheets-Sheet 2
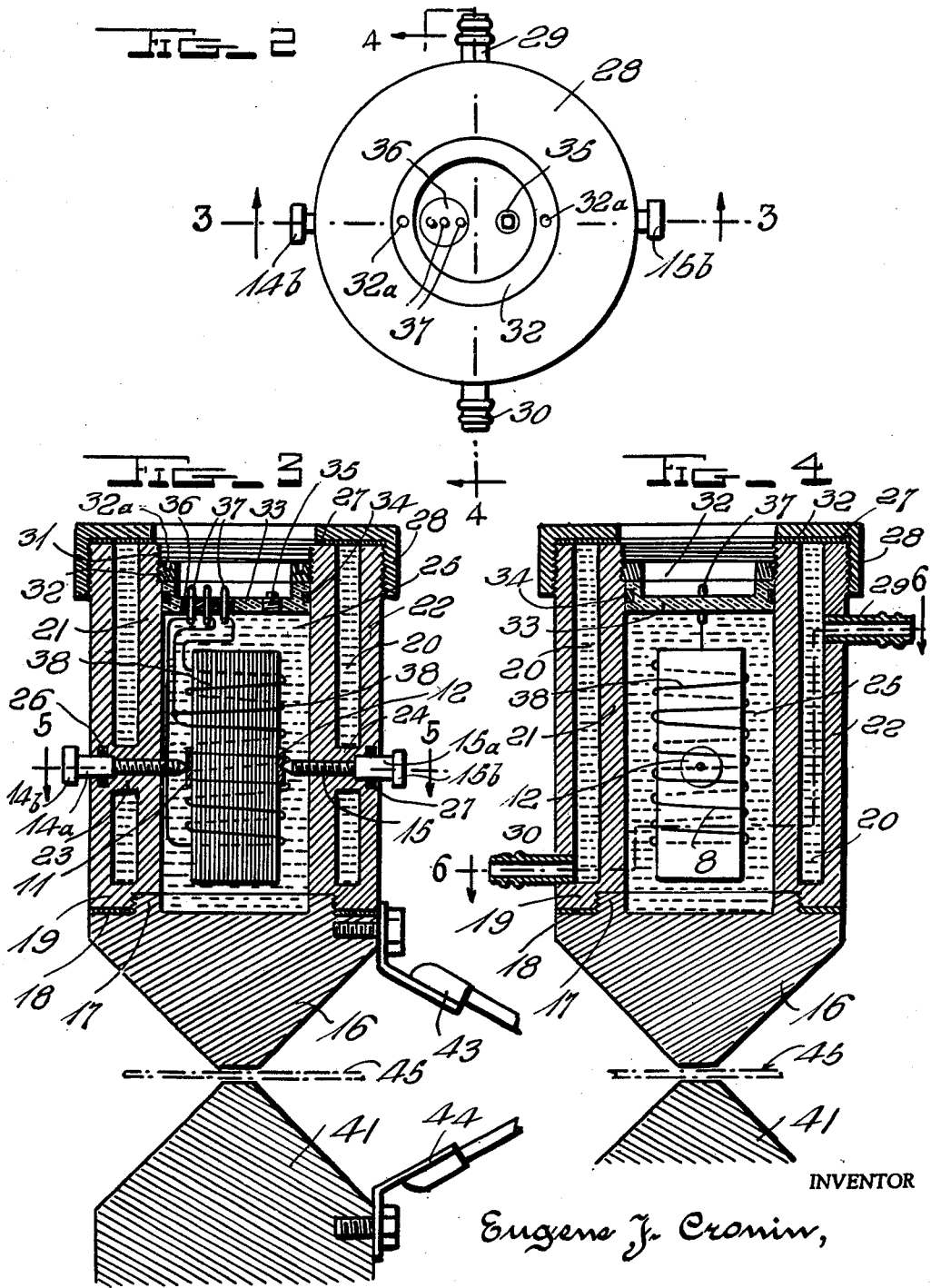
INVENTOR
Eugene J. Cronin,
BY
John B. Brady
ATTORNEY United States Patent Office 2,846,563
Patented Aug. 5, 1958

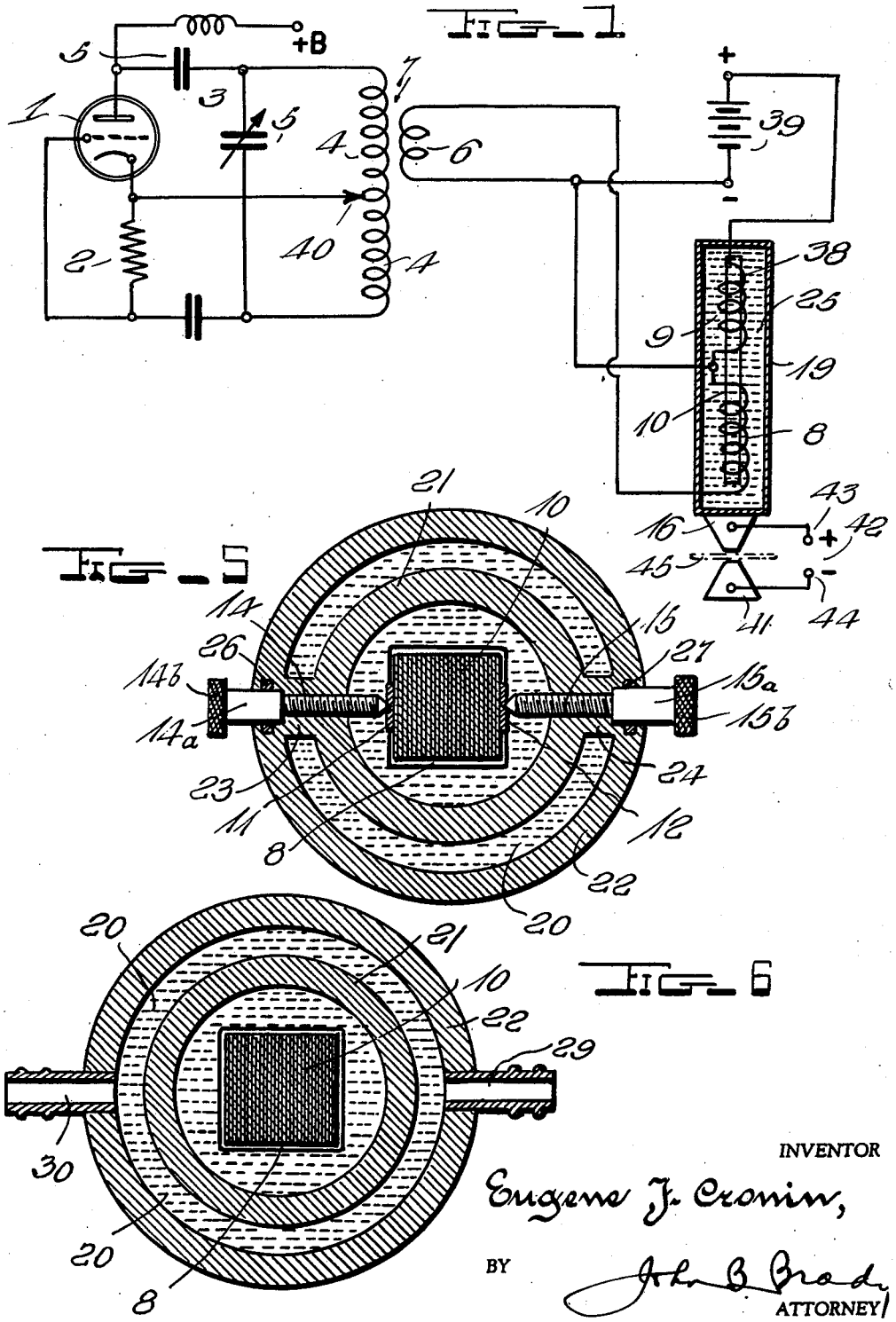

2,846,563

ULTRASONIC WELDER

Eugene J. Cronin, Menlo Park, Calif.

Application October 7, 1955, Serial No. 539,079

7 Claims. (Cl. 219—86)

My invention relates broadly to welding and more particularly to a method and apparatus for controlling the grain structure of welds by ultrasonic means.

One of the objects of my invention is to provide a method and apparatus for developing a grain structure in a weld which is extremely fine and often finer than the grain structure in the parent metal being welded.

Another object of my invention is to provide an arrangement of magnetostrictive oscillator operating at ultrasonic frequencies and associated with at least one of the welding electrodes for effecting a weld in an ultrasonic field.

Still another object of my invention is to provide an arrangement of ultrasonic welding electrode which is associated with a hollow cylinder in which there is disposed a magnetostrictive ultrasonic pressure generating means immersed in a fluid within the hollow cylinder, providing a coupling between the generator and the welding electrode for transmitting ultrasonic vibrations through the welding electrode and the molten metal of the material being welded for forming the welding nugget upon cooling.

Another object of my invention is to provide a construction of ultrasonic welding electrode including a magnetostrictive ultrasonic generator associated with the electrode through a hydraulic coupler including means for cooling the magnetostrictive generator and the associated electrode and also including electrical means for sustaining ultrasonic vibrations in said generator.

Other and further objects of my invention reside in the ultrasonic welding unit including means for restricting the growth of grain in the welding metal and insuring the effecting of a bond while the welding metal maintains an extremely fine grain structure as set forth more fully in the specification hereinafter following by reference to the accompanying drawings, in which:

Figure 1 is a schematic and diagrammatic view of the ultrasonic welder of my invention and the circuits associated therewith for sustaining ultrasonic vibrations therein;

Fig. 2 is a top plan view of one of the ultrasonic welders of my invention;

Fig. 3 is a vertical sectional view taken substantially on line 3—3 of Fig. 2;

Fig. 4 is a vertical sectional view taken substantially on line 4—4 of Fig. 2;

Fig. 5 is a transverse sectional view taken substantially on line 5—5 of Fig. 3; and Fig. 6 is a transverse sectional view taken substantially on line 6—6 of Fig. 4.

My invention is directed to electrical welding and more particularly to a method and circuit for applying ultrasonic energy to a weld. Resistance welding is accomplished by placing two pieces of metal to be bonded between electrodes in a circuit. By passing current from one electrode through the two pieces of metal to the other electrode, the metal in the path of the current is caused to melt by the resistance that the two unbonded pieces of metal present to the flow of current. Once the temperature is high enough to melt the metal, the weld is completed. As this molten metal cools, crystals of the metal start to grow forming grains. The fineness of the grains determines the quality of the weld. Under the best known methods of today the grain structure of a weld is always coarser than the parent metal from which is was made. Failures of welds are traceable to excessive grain structure in the weld itself.

If a metal melt is subjected to an ultrasonic field and allowed to cool from the liquid to solid state in the ultrasonic field, the metal crystals are prevented from coming out of solution and growing into grain structure until the very last moment when the melt freezes. In other words, one moment the melt is a homogeneous liquid mass, and the next moment it is a homogeneous solid with the ultimate in fine grain structure. By applying this principle to welding, whereby ultrasonic energy is applied during and after the electrical current is passed through the work pieces, the same fine grain structure will result in the weld nugget. In this manner an improved bonding is produced which, due to its fine grain structure, has an even superior strength to that of the parent metal.

With ultrasonics it is possible to form alloys which are not miscible in the liquid state in any proportion or in some cases only over part of the range. These alloys, for example, iron and lead, aluminum and cadmium, aluminum and lead, copper and lead, zinc and lead, when processed in an ultrasonic field remain in a state of fine division when they freeze out of solution. By applying ultrasonics to resistance welding it is possible to weld metals of dissimilar nature which cannot now be welded by present day techniques.

The ultrasonic welder of my invention comprises an electrode and two cylinders threaded at each end; one end of each screws into place on the electrode. The space between the two cylinders consists of a hollow jacket and is used as a water cooling chamber in order to cool the magnetostrictive element located in the inner of the two cylinders. The magnetostrictive element is made up of laminated strips of magnetostrictive material. The magnetostrictive element is suspended at its nodal point by set screws forming trunnions. Two coils of wire encompass the magnetostrictive unit, the larger being the energizing coil and the smaller the polarizing coil. The cylinder in which this element is located is filled with a special degassed oil which enhances acoustic coupling to the work. A disc is placed on top of the oil and a screw ring is screwed down on it so that the pressure on the disc causes the chamber to become pressurized. The top of the two cylinders have gaskets affixed to them so that a screw cap ring can be tightened over the gaskets thereby sealing the top end of the water cooling chamber.

When the unit is connected to an oscillator and tuned to the frequency of the magnetostrictive element, intense mechanical waves are set up in the oil of the inner chamber. These mechanical waves are transmitted through the oil to the welding electrode and into the molten metal which will form the weld nugget upon cooling. One ultrasonic electrode and one standard electrode may be used or two ultrasonic electrodes may be provided either both at the same frequency or each one at a different frequency. The electric current for the welding electrode is supplied from its own source while the energy for the ultrasonic element is supplied by its own source.

Referring to the drawings in more detail, reference character 1 designates an ultrasonic oscillator connected through input circuit 2 and output circuit 3 for the generation of ultrasonic oscillations which are sustained in inductance 4, tunable by condenser 5. The ultrasonic oscillations are transferred through secondary winding 6 coupled to inductance 4 conjointly serving as a transformer 7. The output circuit extending from secondary winding 6 connects to winding 8 constituting the energizing winding of the magnetostrictive ultrasonic generator 9. The magnetostrictive ultrasonic generator 9 comprises a laminated magnetostrictive core assembly 10 which is generally in the shape of a parallelepiped having a pair of bearing plates 11 and 12 on the opposite faces thereof, each of which are recessed for the entry of adjustable screw threaded trunnions, shown at 14 and 15, which are adjustably threaded through the cylindrical housing of the upper welding electrode 16. The upper welding electrode 16 terminates in an angular screw threaded projection 17 which is surrounded by a gasket 18 against which the cylindrical housing 19 is engaged by means of an internal screw threaded recess in cylindrical housing 19 which is engaged by the screw threaded projection 17 on the welding electrode 16.

The cylindrical housing 19 is double walled, that is, the housing includes a water jacket 20 which extends between the inner wall 21 and the outer wall 22. The inner and outer walls are united at junctions 23 and 24 through which the screw threaded trunnions 14 and 15 extend. The screw threaded trunnions are sealed against leakage from the interior 25 of the cylindrical housing 19 by means of packing glands 26 and 27 which coact with the smooth cylindrical wall surfaces 14a and 15a of the adjustable trunnions 14 and 15 which are independently adjusted from the external knurled knobs 14b and 15b. The upper extremities of the inner and outer walls 21 and 22 are closed by a gasket 27 which is secured in position by means of a screw threaded cap ring 28 for closing the cooling jacket 20. Cooling water is admitted at the upper end of the jacket 20 through intake 29 and is discharged at the opposite end of the jacket through outlet 30 for continuously circulating cooling fluid through the cylindrical housing 19.

The upper end of the interior portion of the inner wall 21 is internally screw threaded as represented at 31 for receiving the annular pressure nut or ring 32 which may be adjusted in the interior screw threads 31 by use of a suitable wrench engaging socket openings 32a in the pressure nut or ring 32 to adjustably secure the floating ring 33 in position. The floating ring 33 carries the annular packing ring 34 which forms a seal with respect to the interior surface of the inner wall 21. The floating ring 33 carries the filler plug 35 which may be removed or replaced in filling the interior of the chamber 25 in cylindrical housing 19 with the special degassed oil which insures acoustic coupling of the magnetostrictive generator with the welding electrode 16. The floating ring 33 also carries the panel 36 of insulation material which provides means for mounting the terminals 37 which lead to the energizing coil 8 of the magnetostrictive generator as already explained and also to the polarizing coil 38 wound on the magnetostrictive generator core 10. The polarizing coil 38 connects to the polarizing source such as the battery 39 as shown, that is, with the negative terminal of the source connected to the midpoint between energizing winding 8 and polarizing coil 38 and the positive terminal connected with the upper end of polarizing coil 38.

The frequency of the current supplied to the magnetostrictive generator is adjusted within limits by means of adjustable condenser 5 and the tap 40 on inductance 4.

The lower welding electrode is indicated at 41. The lower welding electrode may also be coupled with a magnetostrictive generator, but to explain the principle of my invention I have illustrated the magnetostrictive generator associated only with the upper welding electrode. The welding electrodes are connected to the source of welding current indicated at 42, leading to terminals 43 and 44. The work to be welded is indicated generally at 45 and is passed between welding electrodes 16 and 41. When the electrodes are pressed against the work for the passage of welding current therethrough the magnetostrictive generator is maintained in operation employing magnetostrictive forces from the magnetostrictive generator unit through the oil in the interior of chamber 25 which couples the magnetostrictive generator 9 with the welding electrode 16. These ultrasonic vibrations applied to the metal of the work 45, substantially in the molten state, prevent the grains of the metal and the weld from growing. The plies of the metal melt and mix together and under the continued bombardment by ultrasonic frequencies the grain is frozen and does not grow. The ultrasonic shock waves prevent grain growth, insuring an extremely fine grain structure in the weld. The slug of the weld tends to cool more quickly at the edges than in the center and the grains are prevented from growing. The ultrasonic welding, provided by my invention, may be used to weld aluminum and steel which normally will not mix. Non-miscible metals that will not mix in the molten state can be subjected to dispersion, one within the other, enabling the minute particles of the one metal to mix with the minute particles of the other metal in providing the fine grain weld structure and precluding the growth of grains.

I have found the process of ultrasonic welding and the apparatus described herein for carrying out the process very practical and successful in operation, and while I have described one of the preferred embodiments of my invention, I realize that modifications may be made and I desire that it be understood that no limitations upon my invention are intended other than may be imposed by the scope of the appended claims.

What I claim as new and desire to secure by Letters Patent of the United States is as follows:

1. Welding apparatus comprising a pair of welding electrodes for contacting metal parts to be welded, at least one of said electrodes being hollow, a fluid contained in said hollow electrode, means submerged in said fluid for generating ultrasonic vibrations, means for passing a welding current through said electrodes and means for transmitting said ultrasonic vibrations through said fluid for impressing said vibrations upon the material being welded for preventing the growth of grains therein during the welding operation, and means surrounding said fluid for continuously cooling said fluid while in the condition of ultrasonic vibration.

2. Welding apparatus as set forth in claim 1 in which said means surrounding said fluid for continuously cooling said fluid consists of an enclosing structure comprising inner and outer walls forming a hollow jacket, said walls terminating in a peripheral opening, an annular sealing gasket closing the annular peripheral opening and a closure cap engaging the upper extremities of said inner and outer walls for clamping said annular sealing gasket against the peripheral ends of said walls whereby cooling fluid may be confined for circulation within said jacket.

3. Welding apparatus as set forth in claim 1 in which said means for transmitting said ultrasonic vibrations through said fluid consists of a magnetostrictive generator pivotally mounted on trunnions within said hollow electrode for oscillation therein at ultrasonic frequencies.

4. Welding apparatus as set forth in claim 1 in which said means for transmitting said ultrasonic vibrations through said fluid is a magnetostrictive generator mounted in said hollow electrode and wherein said hollow electrode is formed by inner and outer walls and a floating ring engaged within said inner wall for confining the fluid in said hollow electrode around said magnetostrictive generator.

5. Welding apparatus as set forth in claim 1 in which said means for transmitting said ultrasonic vibrations through said fluid is a magnetostrictive generator consisting of a parallelepiped magnetostrictive core symmetrically mounted on pivots within said hollow electrode, an energizing winding on one end of said core, a polarizing winding on the other end of said core and means connected with said winding for sustaining ultrasonic magnetostrictive vibrations therein.

6. Welding apparatus as set forth in claim 1 in which said means for transmitting said ultrasonic vibrations through said fluid is a magnetostrictive generator and wherein said fluid is a degassed oil forming an acoustic coupling between said magnetostrictive generator and the fluid in the hollow electrode.

7. Welding apparatus as set forth in claim 1 in which said means for transmitting said ultrasonic vibrations through said fluid is a magnetostrictive generator mounted in a cavity in said hollow electrode, said cavity being formed by inner and outer walls spaced from each other to form a cooling jacket, adjustable trunnions extending through said jacket into the cavity in said hollow electrode, said magnetostrictive generator consisting of a parallelepiped symmetrically pivoted in said trunnions, a closure member fitting within said inner wall for confining the fluid within said cavity in said hollow electrode around said magnetostrictive generator, said closure member including a filler plug therein for introducing fluid into said cavity in said hollow electrode and also including a terminal panel having pin terminals therein, and magnetostrictive activating windings on said magnetostrictive generator electrically connected with said pin terminals.

References Cited in the file of this patent

UNITED STATES PATENTS

| | | |
|---|---|---|
| 1,267,463 | Schkommodau | May 28, 1918 |
| 1,915,947 | Paugh | June 27, 1933 |
| 2,014,082 | Fox | Sept. 10, 1935 |
| 2,222,906 | Hentzen | Nov. 26, 1940 |